United States Patent
Huber et al.

(10) Patent No.: US 7,777,426 B2
(45) Date of Patent: Aug. 17, 2010

(54) CIRCUIT ARRANGEMENT AND METHOD FOR CONTROLLING A PULSED POWER SUPPLY

(75) Inventors: Andreas Huber, Maisach (DE); Bernhard Reiter, München (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 1063 days.

(21) Appl. No.: 11/395,265

(22) Filed: Apr. 3, 2006

(65) Prior Publication Data

US 2006/0220621 A1 Oct. 5, 2006

(30) Foreign Application Priority Data

Apr. 1, 2005 (DE) .................. 20 2005 005 201 U

(51) Int. Cl.
*H05B 37/02* (2006.01)

(52) U.S. Cl. .................. 315/291; 315/307; 315/308

(58) Field of Classification Search ............. 315/209 R, 315/224, 225, 244–247, 291, 307, 308; 323/222
See application file for complete search history.

(56) References Cited

U.S. PATENT DOCUMENTS

| | | | | |
|---|---|---|---|---|
| 5,594,631 | A * | 1/1997 | Katoozi et al. | 363/41 |
| 5,680,015 | A * | 10/1997 | Bernitz et al. | 315/291 |
| 6,664,772 | B2 * | 12/2003 | Saeki et al. | 323/273 |
| 7,064,495 | B2 * | 6/2006 | Lurkens et al. | 315/224 |
| 7,285,920 | B2 * | 10/2007 | Riederer et al. | 315/246 |
| 2003/0062849 | A1 * | 4/2003 | Prasad et al. | 315/224 |

* cited by examiner

*Primary Examiner*—Douglas W Owens
*Assistant Examiner*—Jimmy T Vu

(57) ABSTRACT

Circuit arrangement for controlling a pulsed power supply having improved dynamics compared with conventional "current mode" controllers. According to the invention, the gate signal of a switch (S1) is integrated. As soon as this integral value exceeds the output signal of a control amplifier (CCL), the switch (S1) is switched off again. The circuit arrangement is highly suitable for economically apportioning analog switching elements and functions which are implemented by a microcontroller (uC).

15 Claims, 2 Drawing Sheets

CIRCUIT ARRANGEMENT AND METHOD FOR CONTROLLING A PULSED POWER SUPPLY

FIELD OF THE INVENTION

The invention relates to a circuit arrangement for controlling a pulsed power supply. The invention also relates to a method for controlling a pulsed power supply.

BACKGROUND OF THE INVENTION

Pulsed power supplies are generally known. They are used for matching electrical energy provided to the requirements of a load. This is, for example, matching of the voltage level or provision of a controlled voltage or current source. Pulsed power supplies essentially comprise at least one electronic switch and energy stores such as inductors and capacitors.

In common use is the so-called buck converter, which is used, in a representative manner for other converters, as the basis for describing the present invention. Buck converters are usually used for providing a voltage source which has a voltage which is lower than the voltage of the feed source. Buck converters, however, are also used to operate a load from a voltage source, which load requires a constant current or a constant power. This is the case with discharge lamps. In particular, high-pressure discharge lamps are usually fed by a buck converter.

The buck converter has an electronic switch which is switched on or closed for the duration of an On time and is switched off or open for the duration of an Off time. During the On time, energy flows from the feed source to a buck inductor. During the Off time, the energy stored in the buck inductor flows to the load. The ratio between the On time and the Off time defines the so-called duty cycle, by means of which the energy flow and thus the load voltage or the load current can be controlled. It is therefore necessary for a circuit arrangement to be provided for controlling the pulsed power supply, in this case the buck converter, which produces a control signal for the purpose of switching the electronic switch on, the duty cycle being dependent on a controlled variable.

A typical requirement of such a control circuit is a control speed which is as high as possible in order that changes in load cannot be perceived in the controlled output variable. A control speed which is as high as possible is also necessary if the controlled output variable is intended to follow a desired temporal profile in a manner which is as fault-free as possible. This is particularly the case for the current profile of high-pressure discharge lamps in projection applications. With this application, it is also necessary for control oscillations to be as low as possible.

A circuit arrangement for controlling a pulsed power supply is known from the prior art which functions in the so-called "average current mode". The control signal for the electronic switch is in this case produced by a comparator which compares a saw-tooth voltage of a saw-tooth generator with a threshold value which is dependent on the controlled variable. The threshold value is provided by an integrating differential amplifier, which detects the current through the buck inductor. A desired current value can be input as a reference value to the differential amplifier. The pulsed power supply then acts as a current source, for example for a discharge lamp. The output voltage of the pulsed power supply can also be input, as the reference value, to the differential amplifier. In this case, the pulsed power supply functions as a voltage source.

The implementation of the circuit arrangement for controlling the pulsed power supply in accordance with the prior art described has the following disadvantages:

The control speed cannot be increased as desired, since otherwise the stability of the control is no longer ensured. An increase in the control speed, for example by increasing the so-called closed-loop gain, is always detrimental to stability in the prior art and thus leads to increased control oscillations.

When the threshold value is reached, the electronic switch does not operate immediately but only after a certain delay, owing to unavoidable response times. The change in the buck inductor current during this delay is dependent on the gradient of the change in the buck inductor current. This in turn is dependent on the voltage of the energy feed source. With different voltages of the energy feed source, different peak values result for the buck inductor current. In the prior art, variations in the voltage of the energy feed source thus in principle lead to variations in the controlled variable, i.e. variations in the voltage of the energy feed source cannot be completely compensated for. Better compensation can in turn only take place to the detriment of stability.

SUMMARY OF THE INVENTION

One object of the present invention is to provide a circuit arrangement for controlling a pulsed power supply which avoids the abovementioned disadvantages from the prior art, i.e. the invention provides an increase in the control speed without any amplification of the control oscillations.

One further aspect of the present invention is to provide a circuit arrangement for controlling a pulsed power supply which makes possible the advantageous use of a microcontroller or a digital logic unit.

One further aspect of the present invention is to provide a circuit arrangement for controlling a pulsed power supply which is suitable both for the so-called "continuous mode", in which the buck inductor current does not become zero, and for the so-called "discontinuous mode", in which the buck inductor current in the meantime becomes zero.

These objects are achieved according to the invention by the circuit arrangement forming the time integral of the control signal for the electronic switch and ending the On time if this time integral is greater than the weighted controlled variable.

With the circuit arrangement according to the invention, the saw-tooth generator can advantageously be dispensed with. Instead, a saw-tooth or triangular-waveform voltage results owing to the integration of the control signal. In the prior art, the saw-tooth generator functions independently of the temporal profile of the buck inductor current. In the circuit arrangement according to the invention, the saw-tooth or triangular-wave-form voltage produced by the integration of the control signal begins to rise precisely when the buck inductor current also begins to rise. The saw-tooth or triangular-waveform voltage is thus synchronized with the buck inductor current. This synchronization according to the invention can also take place, in a corresponding manner to the solution described, by the saw-tooth generator from the prior art being triggered by the control signal.

The synchronization according to the invention brings about an increase in the control speed without increasing the closed-loop gain and thus without increasing control oscillations.

If the time integral of the control signal exceeds the weighted controlled variable, the On time ends and the Off time begins, in which the electronic switch is switched off. The duration of the Off time is advantageously determined by two devices; firstly by an Off timer and secondly by a detector which detects the current zero crossing in an inductor, such as the buck inductor. Both devices can be used individually or else in combination.

The Off timer is particularly suitable for the "continuous mode". The time in which the current in the inductor is decreased once the electronic switch has been switched off is limited by the Off timer. The Off timer is part of the control unit and is advantageously implemented by a microcontroller. As soon as the On time has come to an end, the control unit starts the Off timer. Owing to the microcontroller, the maximum Off time which is input by the Off timer can be programmed in a flexible manner and can even be changed in the course of operation.

The detector is particularly suitable for the "discontinuous mode". Owing to the detector, the Off time is set automatically such that the control unit switches the electronic switch on again when the inductor current, for example the buck inductor current, becomes zero. The detector does not necessarily need to detect precisely the current "zero"; it may also respond even at currents which are above or below "zero" for the purpose of compensating for runtimes.

If the circuit arrangement contains both a detector and an Off timer, the pulsed power supply can function both in the "discontinuous mode" and in the "continuous mode". If the maximum Off time has expired before the inductor current has reached zero, the pulsed power supply functions in the "continuous mode". If the inductor current becomes zero before the maximum Off time has expired, the pulsed power supply functions in the "discontinuous mode". A microcontroller can change between the modes even during operation by the maximum Off time being adjusted by means of the Off timer. The structure of the disclosed circuit arrangement makes this possible with little complexity both in terms of hardware and software.

In accordance with the above description, the On time is limited by the control unit by it switching the electronic switch off via the control signal if the time integral of the control signal exceeds the weighted controlled variable. In some cases, it may be expedient not to wait until this is the case but to interrupt the On time prematurely. This may be necessary, for example, if a specific oscillation frequency of the pulsed power supply is desired or the inductor current is intended to be upwardly limited. This is advantageously achieved by an On timer which starts at the beginning of the On time and interrupts the On time once a maximum On time predetermined by the On timer has expired. In a similar manner to the Off timer, the On timer is preferably also implemented by a microcontroller. The maximum On time can thus be programmed in a flexible manner and can also be changed during operation.

The weighted controlled variable, with which the time integral of the control signal is compared, is essentially a signal which is proportional to the inductor current and has been amplified by a control amplifier. The control amplifier is in the form of a differential amplifier. The differential amplifier receives an integrating component via feedback. The differential amplifier forms the difference between the actual variable "inductor current" and a desired variable. A microcontroller advantageously predetermines the value of the desired variable. In this case, it is possible for the desired variable to be calculated in the microcontroller depending on output variables of the pulsed power supply. This makes it possible, for example, to implement power control, as is required when operating high-pressure discharge lamps. The disclosed design of the circuit arrangement makes it possible for the functions to be apportioned economically between micro-controllers and analog components. The differential amplifier and the comparator, which both fulfill critical functions in terms of speed, are implemented in analog fashion. Computationally complex functions and functions which can be programmed in a flexible manner are undertaken by the microcontroller. These include the timer functions and the calculation of a desired value. In a similar manner, a digital logic circuit can also be used in place of the microcontroller. For example, so-called gate arrays or FPGAs can be used.

With the aid of the software in a microcontroller, a method according to the invention for controlling a pulsed power supply having an electronic switch (S1) can be realized which is characterized by the following steps:

fixing a maximum On time in an On timer fixing a maximum Off time in an Off timer switching the electronic switch (S1) on with a control signal and starting the On timer provision of the time integral of the control signal provision of a weighted controlled variable provision of a differential variable formed from the difference between the time integral of the control signal and the weighted controlled variable if the differential variable reaches a threshold value, for example zero, the On timer is reset, the electronic switch is switched off and the Off timer is started if the On timer reaches the maximum On time, the On timer is reset, the electronic switch is switched off and the Off timer is started if the Off timer reaches the maximum Off time, the Off timer is reset, the electronic switch is switched on and the On timer is started.

This method can be characterized by the fact that the pulsed power supply comprises an inductor (L1) and, when the current through the inductor (L1) falls below a predetermined limit value, for example zero, the Off timer is reset, the electronic switch (S1) is switched on and the On timer is started.

BRIEF DESCRIPTION OF THE DRAWINGS

The invention will be explained in more detail below using an exemplary embodiment with reference to drawings, in which.

In the following text, resistors are denoted by the letter R, switches by the letter S, diodes by the letter D, capacitors by the letter C, nodes by the letter N, connections by the letter J and inductors by the letter L, in each case followed by a number.

DETAILED DESCRIPTION OF THE INVENTION

Figure 1:
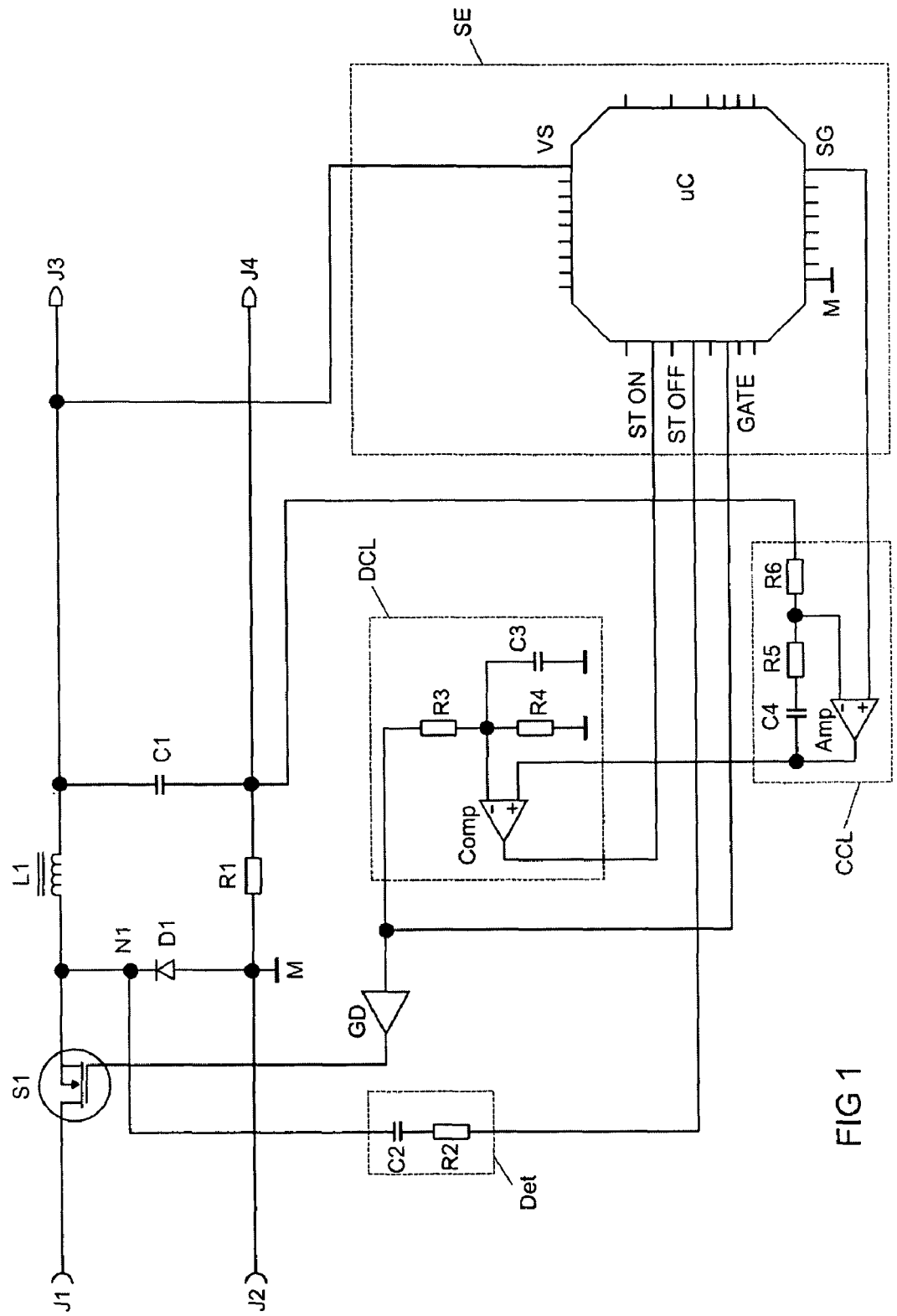
FIG. 1 shows an exemplary embodiment of a circuit arrangement according to the invention.

FIG. 1 shows an exemplary embodiment of a circuit arrangement according to the invention having a buck converter. An energy feed source can be connected to the connection terminals J1 and J2. This may be, for example, a so-called "power factor control" stage.

The buck converter makes available, for a load, a controlled voltage, a controlled current or a controlled power at the connections J3 and J4, depending on the programming of a microcontroller uC. For example, the load may be a discharge lamp.

The buck converter in a known manner comprises an electronic switch S1, a diode D1, a buck inductor L1 and a storage capacitor C1.

S1 and L1 are connected as a series circuit between J1 and J3 via a node N1. S1 is in the form of a MOSFET in FIG. 1. Other electronic switches such as IGBTs or bipolar transistors can also be used. J2 is connected to a ground potential M. The diode D1 is connected between N1 and the ground potential M. The storage capacitor C1 is connected between J3 and J4. A measuring resistor R1 is connected between the ground potential M and J4. A ground-related signal can thus be tapped off at J4 which is proportional to the inductor current through L1.

This signal is associated with the inverting input of a control amplifier CCL. Said control amplifier CCL comprises a differential amplifier Amp, whose output is connected to the inverting input of the differential amplifier Amp via a series circuit comprising a capacitor C4 and a resistor R5. The inverting input of the differential amplifier Amp is connected to the inverting input of the control amplifier CCL via a resistor R6. The noninverting input of the differential amplifier Amp forms the noninverting input of the control amplifier CCL and is connected to an output SG of a micro-controller uC in a control unit SE. Owing to the negative feedback via C4, R5, the control amplifier CCL acts as an integrating amplifier for the measured current signal which is produced by the measuring resistor R1. At the same time, the microcontroller uC predetermines a desired variable via its output SG, and said desired variable is additively superposed on the output of the control amplifier CCL.

The output of the control amplifier CCL is connected to the noninverting input of a comparator Comp.

The microcontroller uC produces a control signal for the purpose of controlling the electronic switch S1 at its output GATE. The control signal is fed to the gate connection of S1 via a driver amplifier GD. The control signal is connected to the inverting input of the comparator Comp via a resistor R3. Said comparator Comp is connected to the ground potential M via the parallel circuit comprising a resistor R4 and a capacitor C3. The output of the comparator Comp is connected to an input ST ON of the microcontroller uC. The comparator Comp, R3, R4 and C3 form a duty cycle controller DCL.

The microcontroller uC has a further input ST OFF, which is connected to the node N1 via a detector Det. The detector Det comprises a series circuit comprising a capacitor C2 and a resistor R2.

The microcontroller uC has a further input VS which is coupled to the output terminal J3.

The way in which the exemplary embodiment shown in FIG. 1 functions will be explained below:

The microcontroller uC switches the electronic switch S1 on at the beginning of the On time via its output GATE. At the same time, it starts its internal On timer, in which the maximum On time is stored. If the input ST ON remains inactive, the maximum On time is reached. The microcontroller uC then switches S1 off and starts its internal Off timer, in which the maximum Off time is stored. If the input ST OFF remains inactive, the maximum Off time is reached. The microcontroller uC then switches S1 on again, and the described cycle begins anew. The maximum On time and the maximum Off time are set by the software of the microcontroller and can be selected depending on the output voltage, which can be measured at the input VS, of the pulsed power supply. A controlled voltage source can thus be implemented, in which case the pulsed power supply is not functioning in the so-called "current mode".

The above-described cycle only runs in this way when the micro-controller sets maximum On and Off times which are so short that they expire before the duty cycle controller DCL or the detector Det become active.

In the case of a longer maximum On time, the following takes place: the control signal is integrated over time in the capacitor C3. The voltage across C3 thus increases linearly. As soon as this voltage becomes greater than the voltage produced by the control amplifier CCL, the duty cycle controller DCL provides a signal at the input ST ON of the microcontroller. Thereupon, the microcontroller interrupts the On time, switches S1 off and starts the Off timer. Since the output of the control amplifier is dependent on the inductor current, the inductor current thus determines the instant at which S1 is switched off, as a result of which a "current mode" is implemented.

In the present exemplary embodiment, the voltage across C3 increases during the On time, and the voltage across the output of the control amplifier CCL is reduced. This voltage is reduced because the inductor current increases and the control amplifier CCL functions in an inverting manner for the inductor current. In a similar manner, the control amplifier CCL could also function in a noninverting manner for the inductor current. In this case, however, an inverted control signal would need to be integrated and compared in a comparator with the output of the control amplifier CCL. It is merely critical that the signals to be compared have gradients with opposing mathematical signs.

In the present exemplary embodiment, the output of the control amplifier CCL is connected to the noninverting input of the comparator Comp, and the integrating capacitor C3 feeds its voltage to the inverting input. As soon as the voltage across C3 exceeds the output voltage of the control amplifier CCL, a negative edge is produced at the output of the comparator Comp.

The microcontroller is designed such that it recognizes this negative edge as the active signal of the duty cycle controller DCL. In a similar manner, the inputs of the comparator Comp could also be interchanged. In this case, the microcontroller would have to respond to a positive edge.

In the exemplary embodiment, the microcontroller feeds in a desired signal at the noninverting input of the control amplifier. If the desired signal becomes greater, the output signal of the control amplifier CCL is raised. It then takes longer until the voltage across the integrating capacitor C3 reaches the level of the output of the control amplifier CCL. The On time is thus extended, and the electronic switch S1 remains switched on for longer, as a result of which the maximum current through the inductor L1 increases. The output current can thus be set or a desired temporal profile of the output current can be experienced.

If the current in the inductor L1 becomes zero, parasitic oscillations thus result at the node N1 for a short period of time. These parasitic oscillations are passed on to the input ST OFF of the microcontroller uC having been filtered by the detector Det. The microcontroller uC tests this input for polarity reversal and thus recognizes the point in time at which the inductor current becomes zero. This function could also be achieved by constantly measuring the inductor current. However, this is more complex at the same speed. As soon as the microcontroller detects a current zero crossing at the input ST OFF, it ends the Off time, switches S1 on and starts the On timer. Since the inductor current is reduced down to zero, the pulsed power supply in this case functions in the "discontinuous mode".

If the maximum Off time expires before the inductor current is reduced to zero, the pulsed power supply in this case functions in the "continuous mode".

In the case of microcontrollers, analog circuits can also be integrated. The control amplifier CCL or the duty cycle controller DCL or respective parts thereof can therefore be integrated in the microcontroller.

On the other hand, the functions performed by the microcontroller can also be implemented by separate circuit elements. For example, the evaluation of the actual value at the input VS and the output of a desired value at the output SG can be implemented by one circuit element, while the production of a PWM signal by means of the connections ST ON, ST OFF and GATE is implemented by a further circuit element.

Furthermore, it may also be possible for a plurality of converter circuits to be controlled by one microcontroller. For example, three buck converters for the purpose of supplying energy to differently colored light-emitting diodes can be controlled by a common microcontroller if said microcontroller has the number of inputs and outputs required for this purpose.

Figure 2:
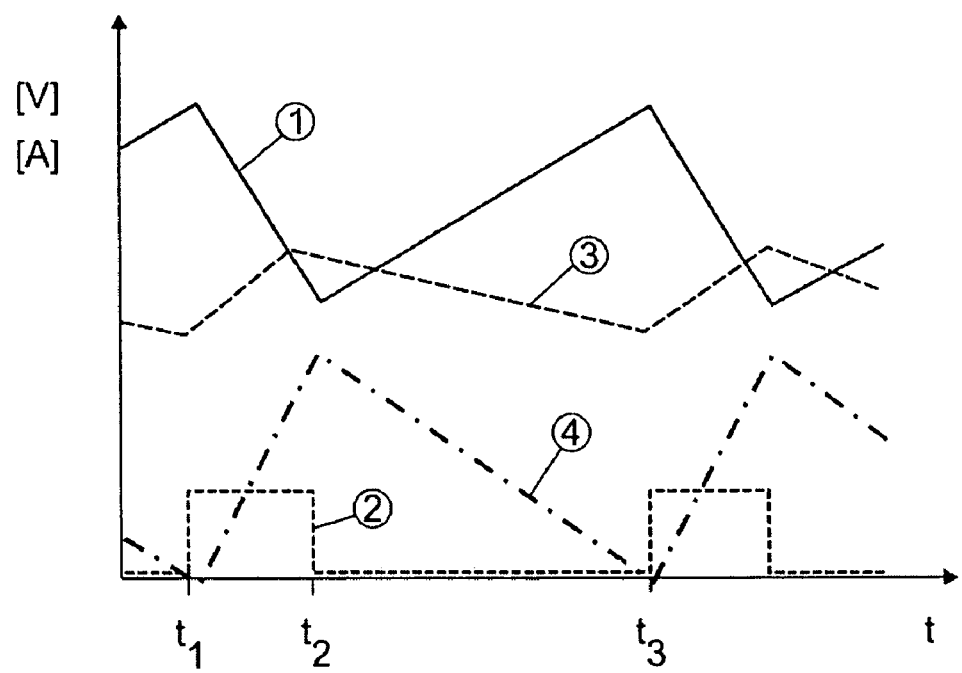
FIG. 2 shows typical temporal profiles of currents and voltages in a circuit arrangement according to the invention in the "discontinuous mode"

FIG. 2 illustrates typical temporal profiles of currents and voltages in a circuit arrangement according to the invention in the "discontinuous mode". In the figure, curve 1 shows the voltage across the output of the control amplifier CCL; curve 2 shows the control signal for the electronic switch S1; curve 3 shows the voltage across the integrating capacitor C3; and curve 4 shows the inductor current through L1.

At time t1, S1 is switched on in response to the control signal. Thereupon, the inductor current and the voltage across C3 are increased. Curve 1, the voltage across the output of the control amplifier CCL, falls owing to the inverting function of the differential amplifier Amp. At time t2, curve 3 is greater than curve 1, whereupon the input ST ON of the microcontroller uC receives a negative edge. The On time is ended. After a short delay by the microcontroller uC, the electronic switch S1 switches off corresponding to curve 2. The inductor current and the voltage across C3 again fall, while the voltage across the output of the control amplifier CCL increases again. At time t3, the inductor current becomes zero and the described procedure is repeated.

Figure 3:
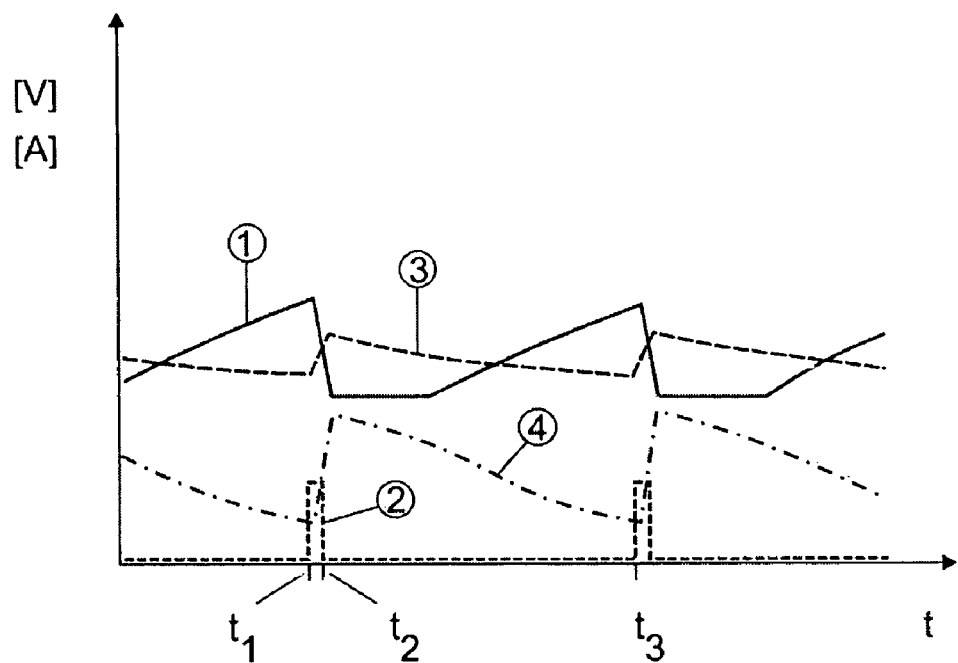
FIG. 3 shows typical temporal profiles of currents and voltages in a circuit arrangement according to the invention in the "continuous mode".

FIG. 3 shows typical temporal profiles of currents and voltages in a circuit arrangement according to the invention in the "continuous mode". The curves illustrated show the same signals as in FIG. 2. The difference from FIG. 2 consists in the fact that the inductor current has not yet been reduced to zero and nevertheless the electronic switch S1 is switched on again at time t1 or t3 because the maximum Off time has expired. Curve 1 shows, after time t2, limiting effects which are of no significance for the operation of the circuit arrangement.

The invention claimed is:

1. A circuit arrangement for controlling a pulsed power supply, the circuit arrangement comprising:
an electronic switch configured to be switched on for the duration of an On time and switched off for the duration of an Off time by a control signal;
a control unit configured to:
generate the control signal; and
end the On time if a STOP-ON signal is received;
a control amplifier configured to:
receive a controlled variable, the controlled variable being related to a magnitude of a signal of the pulsed power supply; and
generate a weighted controlled variable;
a comparator configured to:
compare a time integral value of the control signal with a controlled weighted variable value; and
generate the STOP-ON signal if the time integral value of the control signal is higher than the controlled weighted variable value.

2. The circuit arrangement as claimed in claim 1, wherein the pulsed power supply comprises an inductor and the controlled variable is related to a magnitude of current through the inductor.

3. The circuit arrangement as claimed in claim 2, wherein the control amplifier comprises an integrating differential amplifier configured to generate a difference variable at least partly based on the controlled variable and a desired variable, wherein the weighted controlled variable is at least partly based on the difference variable.

4. The circuit arrangement as claimed in claim 3, wherein the control unit further comprises a micro-controller configured to provide the desired variable.

5. The circuit arrangement as claimed in claim 4, wherein the control unit is further configured to detect an output variable of the pulsed power supply and evaluate the output variable so as to establish the desired variable.

6. The circuit arrangement as claimed in claim 5, wherein the output variable indicates the output voltage of the pulsed power supply.

7. The circuit arrangement as claimed in claim 1, wherein the control unit is further configured to start an Off timer at the end of the On time, and this Off timer predetermines a maximum Off time in which the electronic switch is switched off, the control unit further configured to switch the electronic switch on at the end of the Off time.

8. The circuit arrangement as claimed in claim 7, wherein the On timer and the Off timer are implemented by a microcontroller.

9. The circuit arrangement as claimed in claim 1, wherein the control unit further comprises an On timer configured to determine a maximum On time; and the control unit is further configured to switch the electronic switch off when the maximum On time is reached.

10. The circuit arrangement as claimed in claim 1, wherein the pulsed power supply comprises an inductor and the circuit arrangement further comprises a detector, the detector configured to transmit a STOP-OFF signal to a STOP-OFF input of the control unit in the event of a current zero crossing in the inductor; and the control unit is further configured to end the Off time and switch the electronic switch on when the STOP-OFF signal is received at the STOP-OFF input.

11. The circuit arrangement as claimed in claim 1, wherein the pulsed power supply is a buck converter.

12. An operating device for operating high-pressure discharge lamps, wherein the operating device comprises the circuit arrangement as claimed in claim 1.

13. A circuit arrangement for controlling a pulsed power supply, the circuit arrangement comprising:
an electronic switch configured to be switched on for the duration of an On time and switched off for the duration of an Off time by a control signal;
a control unit configured to:
generate the control signal; and
end the On time if a STOP-ON signal is received;
an inverter configured to invert the control signal; and
a comparator configured to:
compare a time integral value of an inverted control signal with a controlled variable value, wherein a controlled variable is related to a magnitude of a signal of the pulsed power supply; and generate the STOP-ON signal if the time integral value of the inverted control signal is higher than the controlled variable value.

14. The circuit arrangement as claimed in claim 13, wherein the pulsed power supply comprises an inductor and the controlled variable is related to a magnitude of current through the inductor.

15. The circuit arrangement as claimed in claim 14, wherein the circuit arrangement further comprises:

a control amplifier configured to receive the controlled variable and generate a weighted controlled variable; and wherein the comparator is configured to compare the time integral of the inverted control signal with the controlled weighted variable and generate the STOP-ON signal if the time integral value of the inverted control signal is higher than a weighted controlled variable value.

* * * * *